(12) United States Patent
Macduff et al.

(10) Patent No.: US 8,874,570 B1
(45) Date of Patent: Oct. 28, 2014

(54) SEARCH BOOST VECTOR BASED ON CO-VISITATION INFORMATION

(75) Inventors: Tessa Macduff, Redwood City, CA (US); Sugato Basu, Austin, TX (US); Taher H. Haveliwala, Mountain View, CA (US); Glen Jeh, San Francisco, CA (US); Sepandar D. Kamvar, San Francisco, CA (US); Bilgehan Uygar Oztekin, Mountain View, CA (US); Mehran Sahami, Redwood City, CA (US)

(73) Assignee: Google Inc., Mountain View, CA (US)

( * ) Notice: Subject to any disclaimer, the term of this patent is extended or adjusted under 35 U.S.C. 154(b) by 1502 days.

(21) Appl. No.: 11/001,404

(22) Filed: Nov. 30, 2004

(51) Int. Cl.
*G07F 17/30* (2006.01)

(52) U.S. Cl.
USPC ............ 707/730; 707/723; 707/727; 707/728; 707/740

(58) Field of Classification Search
CPC .................................. G06F 17/30; G06F 17/00
See application file for complete search history.

(56) References Cited

U.S. PATENT DOCUMENTS

| | | | |
|---|---|---|---|
| 5,724,567 A | 3/1998 | Rose et al. ..................... 395/602 |
| 5,754,939 A | 5/1998 | Herz et al. ...................... 455/4.2 |
| 6,012,051 A | 1/2000 | Sammon, Jr. et al. ........... 706/52 |
| 6,078,916 A | 6/2000 | Culliss .............................. 707/5 |
| 6,182,068 B1 | 1/2001 | Culliss .............................. 707/5 |
| 6,272,507 B1 * | 8/2001 | Pirolli et al. ................... 715/513 |
| 6,285,999 B1 | 9/2001 | Page ................................. 707/5 |
| 6,314,420 B1 | 11/2001 | Lang et al. |
| 6,321,228 B1 | 11/2001 | Crandall et al. ................ 707/10 |
| 6,327,590 B1 * | 12/2001 | Chidlovskii et al. .............. 707/5 |
| 6,338,066 B1 | 1/2002 | Martin et al. .................... 707/10 |
| 6,385,619 B1 | 5/2002 | Eichstaedt et al. ............ 707/104 |
| 6,421,675 B1 * | 7/2002 | Ryan et al. ..................... 707/100 |

(Continued)

FOREIGN PATENT DOCUMENTS

| | | | | |
|---|---|---|---|---|
| EP | 1050830 A2 | 11/2000 | .............. G06F 17/30 |
| EP | 1107128 A1 | 6/2001 | .............. G06F 17/30 |

(Continued)

OTHER PUBLICATIONS

Papineni. "Why inverse document frequency?" 2001. pp. 1- 8. Retrieved on Feb. 22, 2007 from <http://delivery.acm.org/10.1145/1080000/1073340/p4-papineni.pdf?key1=1073340&key2=9112512711&coll=GUIDE&dl=GUIDE&CFID=11879344&CFTOKEN=92440674>.*

(Continued)

*Primary Examiner* — Farhan Syed
(74) *Attorney, Agent, or Firm* — Morgan, Lewis & Bockius LLP

(57) ABSTRACT

In a method of generating a search boost vector, a first set of content location identifiers for first content are provided. A second set of content location identifiers for second content are identified. The second content is related to the first content in accordance with one or more predefined criteria. A search boost vector is generated by determining weights corresponding to content location identifiers in the second set of content location identifiers. The search boost vector may also be generated by determining weights corresponding to content location identifiers in the first set of content location identifiers. The predefined criteria may include one or more additional content location identifiers that are co-visited with one or more content location identifiers for the first set of content location identifiers. Co-visits are by a community of users during an interval of time.

42 Claims, 10 Drawing Sheets

(56) References Cited

U.S. PATENT DOCUMENTS

| | | | |
|---|---|---|---|
| 6,493,702 B1* | 12/2002 | Adar et al. | 707/3 |
| 6,535,888 B1 | 3/2003 | Vijayan et al. | 707/104 |
| 6,546,393 B1* | 4/2003 | Khan | 707/10 |
| 6,584,466 B1 | 6/2003 | Serbinis et al. | 707/10 |
| 6,606,619 B2 | 8/2003 | Ortega et al. | 707/2 |
| 6,606,657 B1 | 8/2003 | Zilberstein et al. | |
| 6,606,659 B1 | 8/2003 | Hegli et al. | 709/225 |
| 6,691,108 B2 | 2/2004 | Li | 707/3 |
| 6,718,365 B1* | 4/2004 | Dutta | 709/203 |
| 6,807,574 B1 | 10/2004 | Partovi et al. | |
| 6,836,773 B2 | 12/2004 | Tamayo et al. | 707/6 |
| 6,839,680 B1 | 1/2005 | Liu et al. | 705/10 |
| 6,868,525 B1 | 3/2005 | Szabo | 715/738 |
| 6,873,982 B1 | 3/2005 | Bates et al. | 707/5 |
| 6,892,198 B2 | 5/2005 | Perisic et al. | 707/5 |
| 6,895,406 B2 | 5/2005 | Fables et al. | 707/102 |
| 6,912,505 B2 | 6/2005 | Linden et al. | 705/14 |
| 6,917,938 B2 | 7/2005 | Shea et al. | |
| 6,934,748 B1 | 8/2005 | Louviere et al. | |
| 6,959,319 B1 | 10/2005 | Huang et al. | 709/203 |
| 6,990,628 B1* | 1/2006 | Palmer et al. | 715/500 |
| 7,020,646 B2 | 3/2006 | Brexel et al. | 707/1 |
| 7,031,961 B2 | 4/2006 | Pitkow et al. | 707/4 |
| 7,100,111 B2 | 8/2006 | McElfresh et al. | 715/517 |
| 7,152,063 B2 | 12/2006 | Hoashi et al. | |
| 7,207,062 B2 | 4/2007 | Brustoloni | 726/13 |
| 7,240,049 B2 | 7/2007 | Kapur | 707/3 |
| 7,430,561 B2 | 9/2008 | Bailey et al. | |
| 7,565,367 B2 | 7/2009 | Barrett et al. | |
| 7,693,827 B2 | 4/2010 | Zamir et al. | |
| 7,747,611 B1 | 6/2010 | Milic-Frayling et al. | |
| 7,885,901 B2 | 2/2011 | Hull et al. | |
| 2001/0037407 A1 | 11/2001 | Dragulev et al. | |
| 2002/0007364 A1* | 1/2002 | Kobayashi et al. | 707/203 |
| 2002/0024532 A1 | 2/2002 | Fables et al. | 345/700 |
| 2002/0069190 A1* | 6/2002 | Geiselhart | 707/1 |
| 2002/0073065 A1 | 6/2002 | Inaba et al. | 707/1 |
| 2002/0078045 A1* | 6/2002 | Dutta | 707/7 |
| 2002/0091736 A1 | 7/2002 | Wall | |
| 2002/0103789 A1* | 8/2002 | Turnbull et al. | 707/3 |
| 2002/0123988 A1 | 9/2002 | Dean et al. | 707/3 |
| 2002/0138331 A1 | 9/2002 | Hosea et al. | |
| 2002/0156917 A1 | 10/2002 | Nye | 709/238 |
| 2002/0198882 A1 | 12/2002 | Linden et al. | 707/10 |
| 2003/0014399 A1 | 1/2003 | Hansen et al. | |
| 2003/0023715 A1 | 1/2003 | Reiner et al. | 709/224 |
| 2003/0046098 A1* | 3/2003 | Kim | 705/1 |
| 2003/0149937 A1 | 8/2003 | McElfresh et al. | 715/517 |
| 2003/0171977 A1 | 9/2003 | Singh et al. | |
| 2004/0030686 A1 | 2/2004 | Cardno et al. | 707/3 |
| 2004/0034652 A1 | 2/2004 | Hofmann et al. | 707/102 |
| 2004/0044571 A1 | 3/2004 | Bronnimann et al. | 705/14 |
| 2004/0267700 A1* | 12/2004 | Dumais et al. | 707/2 |
| 2004/0267806 A1 | 12/2004 | Lester | 707/103 |
| 2005/0033803 A1 | 2/2005 | Vleet et al. | 709/203 |
| 2005/0060311 A1 | 3/2005 | Tong et al. | |
| 2005/0060389 A1 | 3/2005 | Cherkasova et al. | 709/220 |
| 2005/0071328 A1 | 3/2005 | Lawrence | 707/3 |
| 2005/0071741 A1 | 3/2005 | Acharya et al. | 715/500 |
| 2005/0102282 A1 | 5/2005 | Linden | |
| 2005/0108406 A1 | 5/2005 | Lee et al. | |
| 2005/0131866 A1 | 6/2005 | Badros et al. | 707/3 |
| 2005/0144193 A1 | 6/2005 | Henzinger | 707/103 |
| 2005/0203884 A1 | 9/2005 | Allen et al. | 707/3 |
| 2005/0216434 A1* | 9/2005 | Haveliwala et al. | 707/1 |
| 2005/0222981 A1 | 10/2005 | Lawrence et al. | 707/3 |
| 2005/0222989 A1 | 10/2005 | Haveliwala et al. | 707/3 |
| 2005/0240580 A1 | 10/2005 | Zamir et al. | 707/4 |
| 2005/0262043 A1 | 11/2005 | Saito | |
| 2005/0278317 A1 | 12/2005 | Gross et al. | 707/3 |
| 2006/0004711 A1 | 1/2006 | Naam | 707/3 |
| 2006/0026147 A1 | 2/2006 | Cone et al. | 707/3 |
| 2006/0041549 A1 | 2/2006 | Gundersen et al. | 707/5 |
| 2006/0059138 A1 | 3/2006 | Milic-Frayling et al. | 707/3 |
| 2006/0064411 A1 | 3/2006 | Gross et al. | 707/3 |
| 2006/0074883 A1 | 4/2006 | Teevan et al. | 707/3 |
| 2006/0106769 A1* | 5/2006 | Gibbs | 707/3 |
| 2006/0112079 A1 | 5/2006 | Holt et al. | |
| 2006/0161553 A1 | 7/2006 | Woo | |
| 2007/0005575 A1 | 1/2007 | Dai et al. | |
| 2007/0033171 A1 | 2/2007 | Trowbridge | 707/3 |
| 2007/0067297 A1 | 3/2007 | Kublickis | |
| 2007/0088692 A1 | 4/2007 | Dean et al. | 707/5 |
| 2007/0088693 A1 | 4/2007 | Lawrence | 707/5 |
| 2007/0094254 A1 | 4/2007 | Cutts et al. | 707/5 |
| 2007/0094255 A1 | 4/2007 | Acharya et al. | 707/5 |
| 2007/0100796 A1 | 5/2007 | Wang | |
| 2007/0260597 A1 | 11/2007 | Cramer | 707/5 |
| 2007/0276790 A1 | 11/2007 | Walsh et al. | 707/2 |
| 2008/0065631 A1 | 3/2008 | Baeza-Yates et al. | |
| 2008/0140641 A1 | 6/2008 | Wang | 707/5 |
| 2008/0228754 A1* | 9/2008 | Frank et al. | 707/5 |

FOREIGN PATENT DOCUMENTS

| | | | |
|---|---|---|---|
| JP | 2002-132822 A | 5/2002 | |
| JP | 2002-334106 A | 11/2002 | |
| JP | 2004-118716 A | 4/2004 | |
| WO | WO 03/107127 A2 | 12/2003 | |
| WO | WO 2004/021110 A2 | 3/2004 | |
| WO | WO 2005/001719 A1 | 1/2005 | G06F 17/30 |
| WO | WO 2005/033979 A1 | 4/2005 | G06F 17/30 |
| WO | WO 2005/055015 A2 | 6/2005 | |
| WO | WO 2006/014562 A1 | 6/2005 | G06F 17/60 |

OTHER PUBLICATIONS

"Inverse Document Frequency." Oct. 22, 2000. p. 1. Retrieved on February 21, 2007 from <http://www2.sims.berkeley.edu/courses/is202/f98/Lecture17/sld026.htm>.*

Zamir, Oren et al., Grouper: a dynamic clustering interface to Web search results, 1999, Elsevier Science, pp. 1-14.*

Whyte, Anne, Assessing Community Telecentres: Guidelines for Researchers, 2000, International Development Research Centre, pp. 1-90.*

Berger, Adam, "Statistical machine learning for information retreival," Apr. 2001, School of Computer Science, Carnegie Mellon University, pp. 1-147.*

Chen, Zhixiang, et al, "Yarrow: A Real-Time Client Side Meta-Search Learner," 2000, AAAI Technical Report, pp. 12-17.*

Carmel, David, "Experiments in TREC—the world championships for Search Engines," 2003, IBM Haifa Research Lab, pp. 1-46.*

Chen, Zhixiang, et al., Real-Time Adaptive Feature and Document Learning for Web Search, 2001, Journal of the American Society for Information Science and Technology, pp. 10-20.*

Brin, The Anatomy of a Large-Scale Hypertextual Web Search Engine, Computer Networks and ISDN Systems, Apr. 1998, 30(1-7):107-117.

Cho, Efficient Crawling Through URL Ordering, Computer.Networks and ISDN Systems, Apr. 1998, 30(1-7):161-171.

Ding, Computing Geographical Scopes of Web Resources, Proceedings of the 25$^{th}$ VLDB Conf., Cairo, Egypt, 2000.

Haveliwala, Topic-Sensitive PageRank, Proc. of the 11th Int'l World Wide Web Conf., Honolulu, Hawaii, May 2002.

Henzinger, Web Information Retrieval—an Algorithmic Perspective, Lecture Notes in Computer Science, Proceedings of the 8$^{th}$ Annual European Symposium, Saarbruken, Germany, Sep. 2000, pp. 1-8.

International Search Report for International Application No. PCT/US07/065710, mailed Nov. 12, 2007.

International Search Report for International Application No. PCT/US2005/025081, mailed Dec. 2, 2005.

Jeh, Scaling Personalized Web Search, Stanford Univ. Technical Report, 2002.

Pretschner, Ontology Based Personalized Search, Proc.11th IEEE Int'l Conf. on Tools with Artificial Intelligence, Chicago, Illinois, Nov. 1999, pp. 391-398.

Google Inc., Appeal Decision, JP 2007-521656, Feb. 15, 2013, 17 pgs.

Google Inc., Notice of Reasons for Rejection, JP 2011-145885, Apr. 22, 2013, 5 pgs.

(56) References Cited

OTHER PUBLICATIONS

Google Inc., Notification on the Grant of Patent Right for Invention, CN 200780019748.4, May 29, 2013, 1 pg.
Google Inc., Office Action, CA 2573672, Jul 19, 2012, 2 pgs.
Google Inc., Office Action, CN 200580030640.6, Feb. 22, 2008, 16 pgs.
Google Inc., Office Action, CN 200780019748.4, Nov. 10, 2010, 7 pgs.
Google Inc., Office Action, CN 200780019748.4, Mar. 20, 2012, 4 pgs.
Google Inc., Office Action, CN 200780019748.4, Oct. 23, 2012, 3 pgs (no English translation to date).
Google Inc., Office Action, EP 05771572.4, Jan. 9, 2009, 3 pgs.
Google Inc., Office Action, EP 07759892.8, Jan. 23, 2009, 2 pgs.
Google Inc., Office Action, JP 2007-521656, Mar. 4, 2011, 2 pgs.
Google Inc., Office Action, JP 2007-521656, Oct. 19, 2010, 6 pgs.
Google Inc., Office Action, KR 2007-7003372, Sep. 29, 2011, 2 pgs.

* cited by examiner

500

| Source Identification | Time Stamp | URL |
|---|---|---|
| Identifier 1 | 12.05 | URL A |
| Identifier 1 | 12.10 | URL B |
| ⋮ | ⋮ | ⋮ |
| Identifier N | 19.30 | URL M |

| URL#1 | URL#2 | Co-Visit Frequency | Visit Frequency to URL#2 |
|---|---|---|---|
| B_1 | A_1 | 1 | 1 |
| B_1 | A_2 | 21 | 1234 |
| B_1 | A_3 | 11 | 19 |
| ⋮ | ⋮ | ⋮ | ⋮ |
| B_2 | C | 5,000 | 1,000,000 |
| ⋮ | ⋮ | ⋮ | ⋮ |
| B_n | D | 9000 | 10,000 |

Figure 8

| URL | Weight |
|---|---|
| 1 | 1.9 |
| 2 | 1.3 |
| ⋮ | ⋮ |
| n | 1.01 |
| n+1 | 1.0 |

Figure 10

SEARCH BOOST VECTOR BASED ON CO-VISITATION INFORMATION

FIELD OF THE INVENTION

The present invention relates to providing search results from search engines, such as Internet and Intranet search engines, and in particular to promoting the rankings of selected search results.

BACKGROUND

Search engines provide a powerful tool for locating documents in a large database of documents, such as the documents on the Internet or World Wide Web (WWW), or the documents stored on the computers of an Intranet. The documents are located in response to a search query submitted by a user. A search query may consist of one or more words, terms, keywords, phrases and/or combinations thereof.

Returning search results that closely match, or ideally, that do match a user's interests is a desired characteristic of search engines. This is especially the case in the current environment where there are ever increasing amounts of information. In the absence of such capability, information overload is a real concern: search engines would return too many results to be useful. As a consequence, existing search engines employ a variety of techniques to improve the relevance of search results. Nonetheless, it is still difficult to tailor search results based on a user's profile. There is a need, therefore, for an improved technique for personalizing search engine results.

SUMMARY

In a method of generating a search boost vector, a first set of content location identifiers for first content are provided. A second set of content location identifiers for second content are identified. The second content is related to the first content in accordance with one or more predefined criteria. A search boost vector is generated by determining weights corresponding to content location identifiers in the second set of content location identifiers. The search boost vector may also be generated by determining weights corresponding to content location identifiers in the first set of content location identifiers. The predefined criteria may include one or more additional content location identifiers that are co-visited with one or more content location identifiers for the first set of content location identifiers. Co-visits are by a community of users during an interval of time.

In some embodiments, determining the weights for the search boost vector includes determining a consistency factor and/or a uniqueness factor for one or more of the content location identifiers in the second set of content location identifiers that are co-visited with one or more of the content location identifiers in the first set of content location identifiers. The uniqueness factor may include a ratio of co-visits by the community of users during the time interval to at least one of the one or more of the content location identifiers in the second set of content location identifiers relative to a number of visits to at least one of the content location identifiers in the first set of content location identifiers. The uniqueness factor may be scaled using one or more inverse document frequencies. The weight corresponding to one or more of the content location identifiers in the search boost vector may include one or more uniqueness factors.

In another method, one or more search boost vectors may be used to boost search results. A search query is received. Search results are generated. The search results are boosted using one or search boost vectors. Boosted search results are provided. In this way, the one or more search boost vectors allow the search results to be personalized based on one or more content location identifiers co-visited by a community of users.

BRIEF DESCRIPTION OF THE DRAWINGS

For a better understanding of the nature and objects of the invention, reference should be made to the following detailed description, taken in conjunction with the accompanying drawings, in which:

FIG. 5 is an illustration of a user URL log data structure according to some embodiments of the invention.

FIG. 8 is an illustration of a URL visit and co-visit data structure according to some embodiments of the invention.

FIG. 10 is an illustration of a search boost vector according to some embodiments of the invention.

Like reference numerals refer to corresponding elements, components or steps throughout the several views of the drawings.

DESCRIPTION OF EMBODIMENTS

Reference will now be made in detail to the various embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments.

One or more search results in a set of search engine results may be personalized by boosting a ranking of one or more of the search results for a user performing a search on the Internet, on one or more Intranets, or on combinations of the Internet and one or more Intranets. The search results may further include local results for information stored on the user's own computer or local network, which may be display along with other search results. Boosting of search results may use one or more search boost vectors. The search boost vectors may cause certain search results to be promoted to a higher position in the search result list if associated content is deemed relevant to the user.

In some embodiments, a search boost vector is, at least in part, generated based on a seed or first set of content location identifiers that may be expanded based on co-occurrence information (i.e., information related to two content location identifiers being visited by one or more users during one or more time intervals). The co-occurrence information may be associated with a user's session data or session data from a community of users. One or more content location identifiers may include one or more uniform resource locators (URLs), as well as addresses or identifiers for one or more documents, one or more content pages (such as web-pages on the WWW) and one or more content sites (such as web-sites on the WWW). Henceforth, the terms "URL" or "URLs" broadly signify one or more of these alternatives. As used in this document, the term "URL" may signify a domain name in a URL and the term "URLs" may signify domain names in URLs.

The co-occurrence information may include one or more additional URLs for additional content that is co-visited, by the user and/or community of users, with the one or more URLs in the first set. The use of co-occurrence information can provide a set of additional URLs that may be related to a first set of URLs. For example, if user A expresses a preference for URL A and its associated contents and co-occurrence information indicates that many users who visited URL A also visited URL B, then there is a likelihood that user A would also be interested in URL B and its associated contents. In some embodiments, co-occurrence information is subject to certain filtering criteria.

Figure 1:
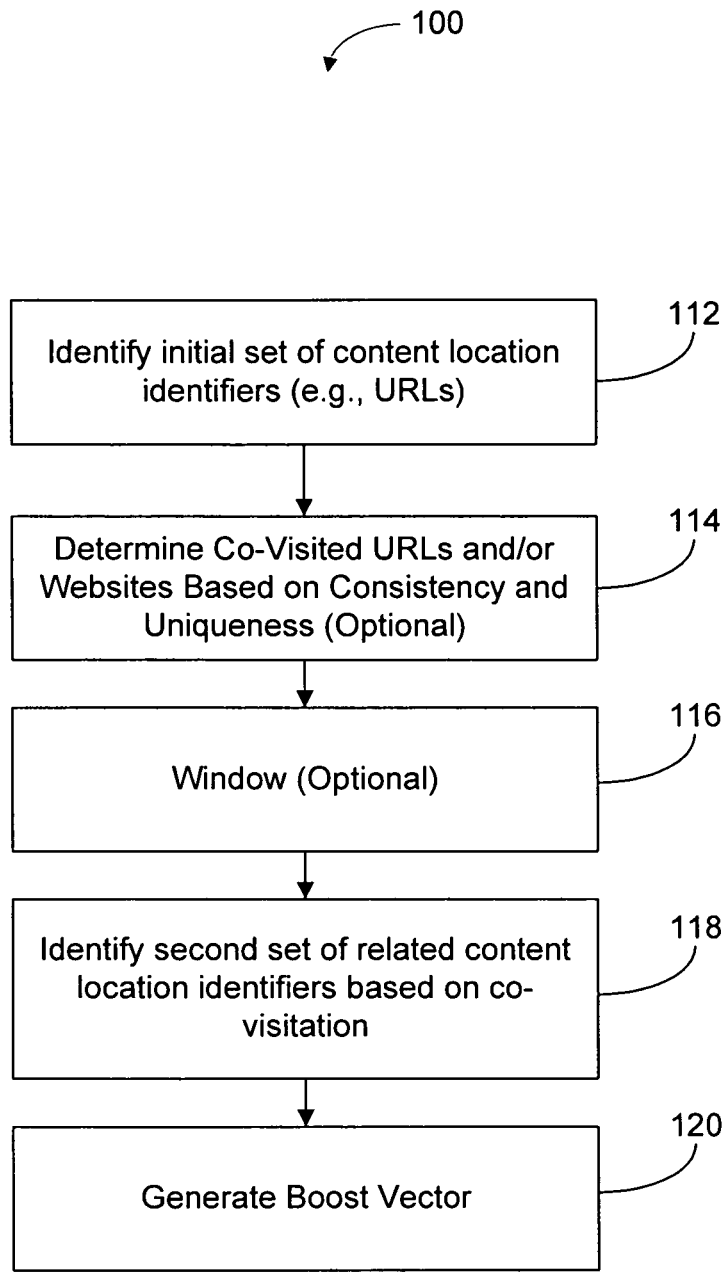
FIG. 1 is a flow chart of a method for generating one or more search boost vectors according to some embodiments of the invention.

FIG. 1 is a flow chart illustrating an embodiment of a method 100 for generating one or more search boost vectors. A seed or first set of URLs for first content is provided 112. The first set of URLs can be determined or generated in a number of ways. For example, in some embodiments, the first set of URLs may be specified by the user by indicating his or her preferences, such as categories of interest, in one or more user profiles. The user profile may contain the first set of URLs, or the user profile may contain other information (e.g., keywords, identifiers of categories of information that are of interest to the user) that is then mapped to the first set of URLs, or a combination of these techniques may be used. Alternately, the first set of URLs at 112 may be the URL of a web-page or web-site from which users may submit search queries to a search engine.

In another embodiment, the first set of URLs at 112 may be the URLs that the user has visited (which may be listed in the user profile or in a log). In addition, the URLs that the user has visited may allow an associated category to be determined either using the one or more content site profiles or by using a classifier on the content of the URLs. Content site profiles may include category information for associated URLs. The first set of URLs may also be pre-identified for a particular category (e.g., one or more URLs identified as associated with "sports" content are pre-identified with a "sports" category). In the event that the user is associated with more than one topic, then multiple sets of URLs may be combined to create the first set of URLs. In some embodiments, the sets are combined in a weighted fashion based on a category's relative importance to the user.

In some embodiments, the first set of URLs may be drawn from a set of URLs previously visited by the user (e.g., by examining a URL or history log associated with the user). In some embodiments, the first set of URLs is composed of those URLs visited by the user during an interval of time or a time window. In some embodiments, the first set of URLs is composed of those URLs frequently visited by the user such as those visited at least a threshold number of times during the interval of time (e.g., at least 4 times during a 7-day period). In some embodiments, the first set of URLs is composed of those URLs identified or marked by the user as belonging to the set of a user's "favorites."

A user's interests may also be determined or identified from meta-information associated with URLs visited by the user. For example, the user may visit a URL that has an associated content site profile (e.g., topics or categories) describing the type of content found at the URL (e.g., the web site "espn.com" may have a "sports" profile associated with it). The URL may have more than one category associated with it, and/or may have a weighted set of categories associated with it. Each of these categories may correspond to a set of predefined URLs that may provide the first set of URLs.

In some embodiments, the first set may be created from a combination of any of the previously mentioned techniques.

Referring back to FIG. 1, after the first set of URLs for first content has been identified 112 it is used to identify a second set of URLs for second content 118. For example, one or more predefined and stored sets of URLs may be accessed based on one or more of the URLs in the first set of URLs. The second set of URLs is related to the first set in accordance with one or more predefined criteria. In some embodiments, the predefined criteria is based on a co-visitation by the user to a URL in the first set of URLs and a URL in the second set of URLs satisfying one or more predefined criteria. In some embodiments, the co-visitation is based on the activities of the user. In other embodiments, the co-visitation is based on the activities of a community of users. In still further embodiments, the co-visitation is based on a combination of actions of the user and the community of users. In some embodiments, co-visitation by the community of users may be during a particular time interval. In some embodiments, the second set of URLs may correspond to at least a portion of the first set of URLs. The search boost vector is generated by determining weights or relevance scores corresponding to URLs in the first set of URLs and/or the second set of URLs 120. In some embodiments, the method 100 illustrated in FIG. 1 may omit one or more operations, may reorder one or more operations or may include one or more additional operations.

Starting with the first set of URLs, determining co-visitation with other URLs may be accomplished in a number of ways. In an exemplary embodiment, a group of users U in the community of users that visit at least one of the URLs in the first set of URLs may be determined based on log data for their sessions. Log data may include URL log data (e.g., URL and timestamp information) and/or cookie information associated with a particular URL. Note that cookies are typically implemented as files stored on the users' computers that indicate the users' identity or other information used by many content locations such as web-pages and web-sites. The terms "cookie" and "cookie file" may be used interchangeably. Cookies may include information such as login or registration identification, user preferences, or any other information that a host at a content location sends to a user's search assistant or browser for the search assistant to return to the host at a later time.

For each URL W in the first set of URLs visited by one of the users in the group U, a set S of additional URLs that are visited by this user within the time interval before and after the visit to URL W, i.e., co-visited, are determined. The time interval may be 30 minutes, 60 minutes or other suitable time periods including time periods less than an average maximum duration of the users' U sessions and a maximum duration of the sessions for one or more users in the group U. One or more of the co-visited URLs S may be added to a set P of potential related URLs. In some embodiments, the set P corresponds to the second set of URLs.

Each of the URLs in the set P has a corresponding weight. In some embodiments, the corresponding weight is indicative of a co-visitation strength between URLs S and the URL W. In some embodiments, the corresponding weight may vary based on a time difference between the visit to at least one of the URLs in the first set of URLs, such as URL W, and one of the co-visited URLs S. For example, a URL S might have a corresponding weight that decreases in value as the time interval between the co-visitation of URLs S and URL W increases. This may be accomplished by applying an optional time-based windowing function 116 (FIG. 1). The time-based windowing function applied 116 may be a symmetric or asymmetric weighting function as a function of time. For example, a visit to a URL B after a visit to a URL A may indicate a stronger relationship between content at URL B to content at URL A than if URL B had been visited before URL A. In some embodiments, the weight may be inversely proportional to a number of URLs visited between the visit to URL W and the co-visit to one of the additional URLs S. If a duplicate URL occurs when adding one or more of the co-visited URLs S to the set P, i.e., the URL already is in the set P, the weights corresponding to these URLs may be combined, for example, by addition.

In some embodiment, the weights corresponding to the URLs in the set P are a measure of a frequency of occurrence of co-visitations. For example, the weight could correspond to a frequency that URL W was co-visited with one of the URLs S. In some embodiments, one or more of the weights may be normalized. For example, one or more weights may be multiplied by an inverse document frequency that reduces those weights corresponding to URLs that are visited by a larger number of users in the group U. Such a normalization may reduce the weights corresponding to popular URLs that are visited often irrespective of a relationship between their content and the content at one or more of the URLs in the first set of URLs.

In some embodiments, the weights could correspond to a probability that one of the URLs S was co-visited with URL W. In some embodiments, the weights could correspond to a conditional probability of co-visiting one of the URLs S given a visit with URL W. In some embodiments, the weights could correspond to a conditional probability of co-visiting URL W given a visit with one of URLs S. And, in some embodiments, the weights could correspond to a combination of one or more of the probabilities.

While this exemplary embodiment determines the second set of URLs and the related weights in the search boost vector, in some embodiments weights may be determined for the first set of URLs, or the first set of URLs and the second set of URLs. For example, URLs in the first set may be provided a corresponding weight related to the importance to the user (e.g., all URLs in the first set could have a corresponding weight set to 1.10 such that each URL, if found in a set of search results, would have its ranking value boosted by 10%). In some embodiments, the windowing function may be applied 116 to one of more of the weights corresponding to one or more of the first set of URLs.

Figure 9A:
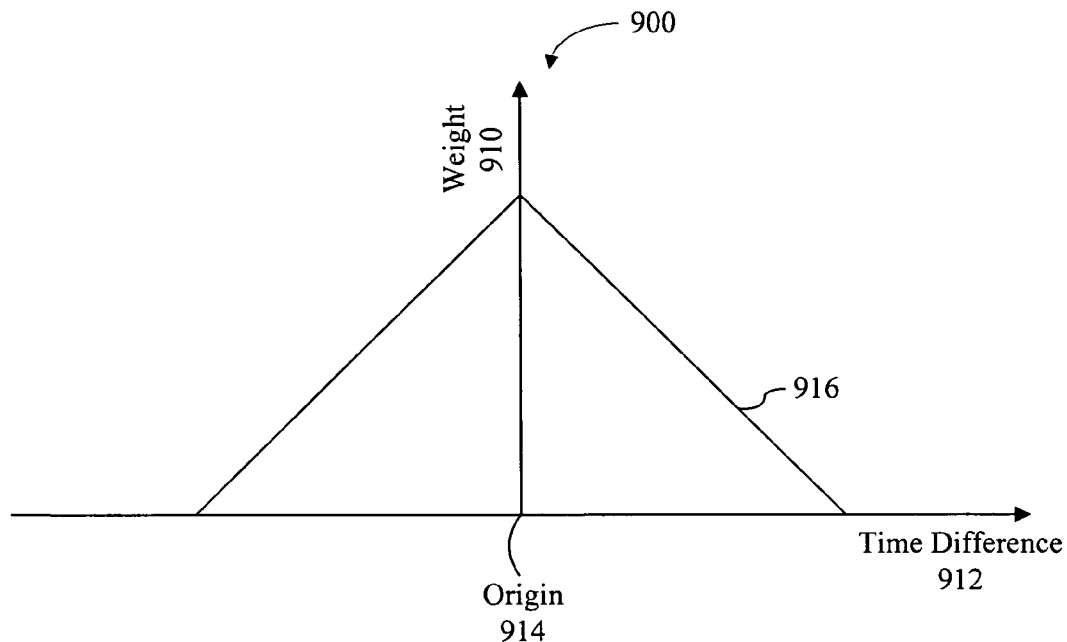
FIG. 9A is an illustration of a temporal window function according to some embodiments of the invention.
Figure 9B:
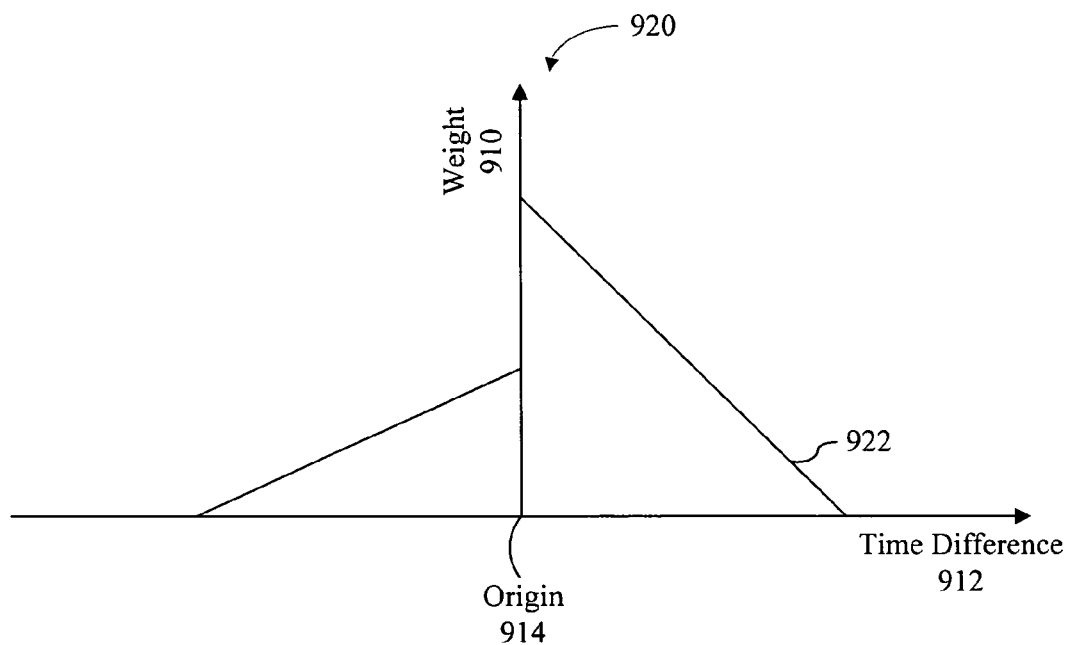
FIG. 9B is an illustration of a temporal window function according to some embodiments of the invention.

FIGS. 9A and 9B illustrate embodiments 900 and 920 of windowing functions for modifying weights in the search boost vector corresponding to one or more URLs. FIG. 9A shows weight 910 as a function of time difference 912 between a visit to one of the URLs in the first set of URLs, such as URL W, and one of the co-visited additional URLs S. Origin 914 corresponds to the visit to URL W. The windowing function shape 916 is symmetric about the origin 914. In embodiment 920, however, the windowing function shape 922 is asymmetric about the origin 914. Embodiments 900 and 920 illustrate windowing functions having a linear dependence of the weight 910 on the time difference 912. In other embodiments, windowing functions may have a non-linear dependence of the weight 910 on the time difference 912.

Figure 10:
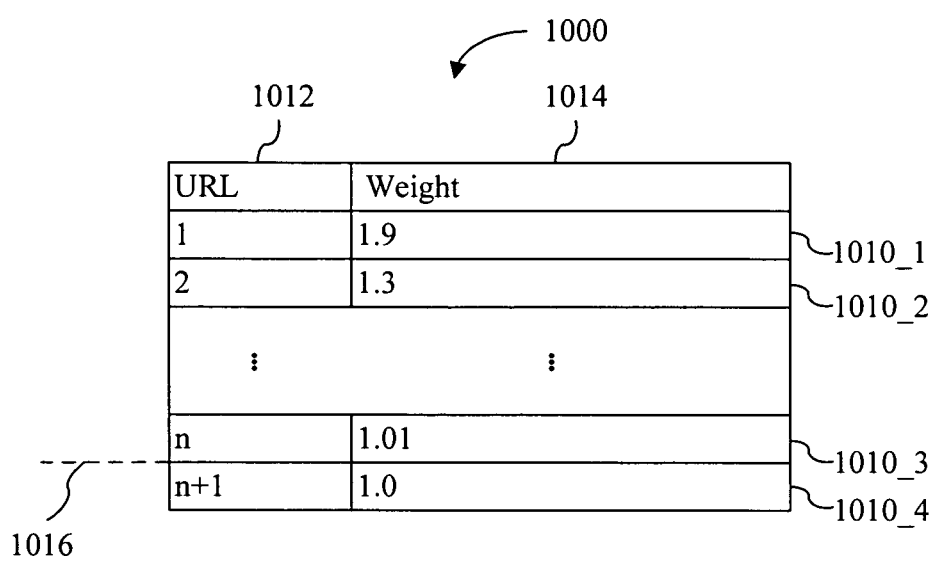

FIG. 10 illustrates an embodiment of a search boost vector 1000 generated using the method 100 (FIG. 1). The search boost vector 1000 has multiple entries 1010. Each entry 1010, such as entry 1010_1, has a URL 1012 and a corresponding weight 1014. In some embodiments, the search boost vector may be truncated after a certain number of URLs 1016 (e.g. n URLs). Alternately, the search boost vector may be truncated by excluding the entries 1010 having weights lower than a threshold or by excluding the entries 1010 with rank values below a threshold rank value.

Figure 2:
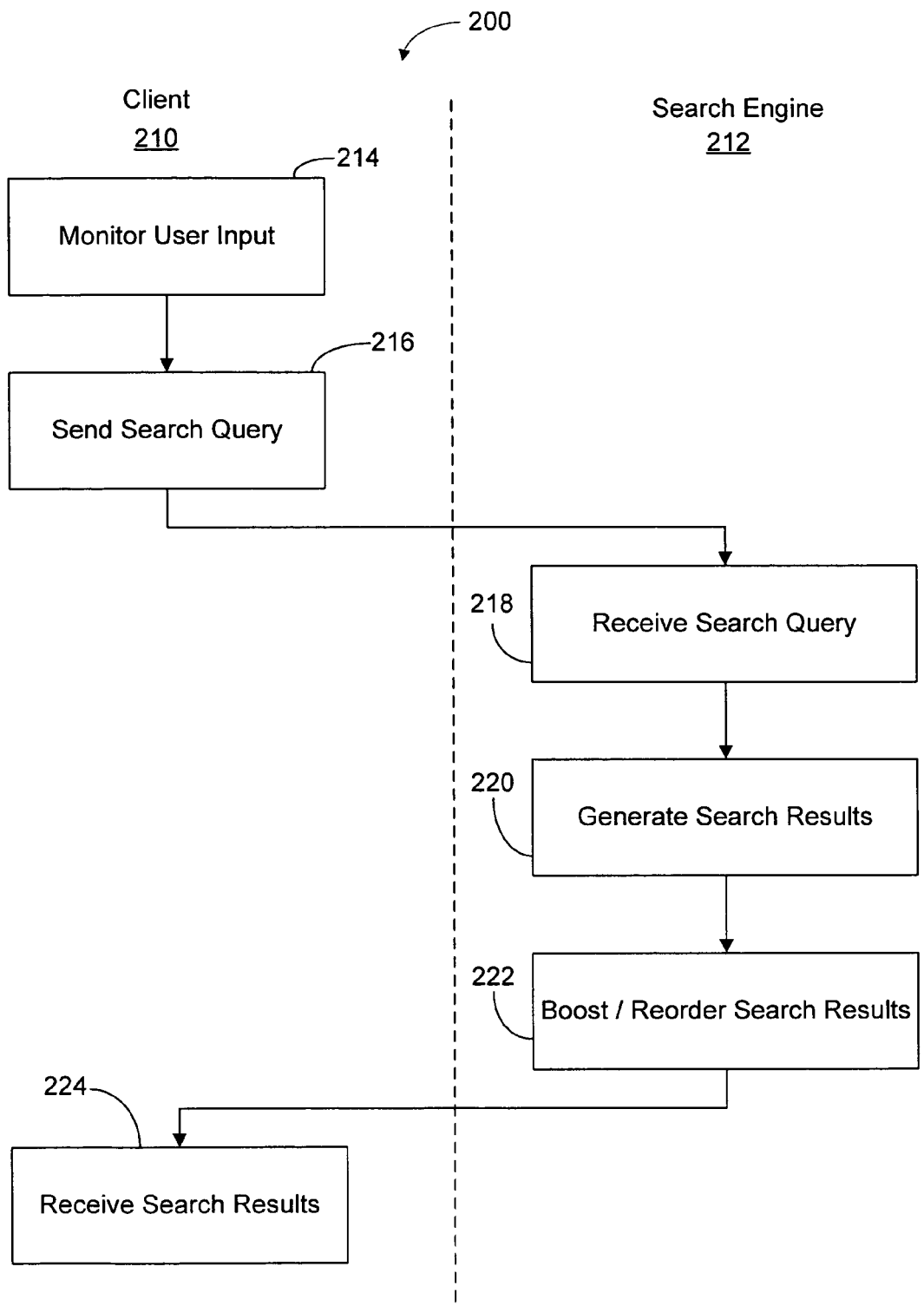
FIG. 2 is a flow chart of a method for using one or more search boost vectors to boost one or more search results from a search engine according to some embodiments of the invention.

The search boost vector 1000 may be used to personalize one or more search results. FIG. 2 is a flow chart illustrating an embodiment of a method 200 for using one or more search boost vectors to boost one or more search results. At a client location 210, the user input to the search assistant is monitored 214 and when appropriate, a search query is sent 216 to a search engine 212. The search engine 212 receives the search query 218 and generates search results 220. Prior to transmission to the client 210, one or more search results are boosted using one or more search boost vectors 222. By changing the weights corresponding to the one or more search results, the boosting modifies an order in of the search results. The boosted/reordered search results are received 224 and/or presented to the user, i.e., the rankings of one or more search results are changed. In some embodiments, the method 200 illustrated in FIG. 2 may omit one or more operations, may reorder one or more operations or may include one or more additional operations.

As discussed previously, the search boost vectors may be identified or determined based on one or more user profiles or preferences and/or one or more content site profiles. Boosting search results using one or more search boost vectors that are identified or determined based on one or more user profiles or preferences is often referred to as personalized search. Boosting search results using one or more search boost vectors that are identified or determined based on one or more content site profiles is often referred to as content site flavored search. In this discussion, personalized search results are search results produced by personalized search and/or content site flavored search.

In some embodiments, each search result has an information retrieval value, sometimes called a query score. The one or more search results are boosted by multiplying one or more of the information retrieval values by one or more weights 1014 (FIG. 10) in the search boost vector, such as search boost vector 1000 (FIG. 10). The search boost vector may be determined using the method 100 illustrated in FIG. 1. In particular, the first set of URLs may be provided and the second set of URLs may be identified 118 and/or determined 116 (see below) in accordance with the one or more predefined criteria. In some embodiments, the one or more predefined criteria may include co-visiting of one or more additional URLs and one or more of the URLs in the first set of URLs.

Figure 3:
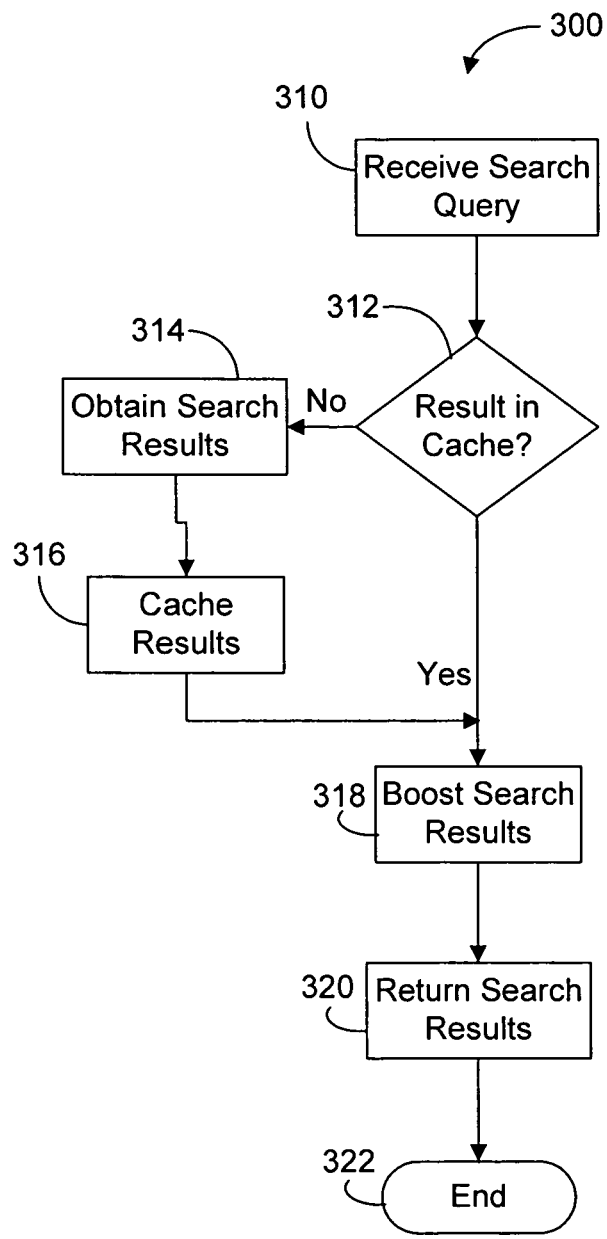
FIG. 3 is a flow chart of a method for using one or more search boost vectors to boost one or more search results from a search engine according to some embodiments of the invention.

FIG. 3 illustrates an embodiment of a method 300 using one or more search boost vectors in a search engine, such as the search engine 212 (FIG. 2). A search query is received 310. If search results for the search query are found in a search results cache 312, the one or more search results are boosted 318 using one or more search boost vectors. If the search results for a query are not in the cache 312, search results for the search query are obtained 314, cached 316 and boosted 318. The boosting 318 uses one or more search boost vectors. The search results are returned 320 and the procedure ends 322. In some embodiments, caching 316 of the search results is optional, and a decision to cache or not cache the search results may be based on a score or other assessment indicating a likelihood of the same search query being processed again.

As noted previously, in some embodiments URLs added to the second set include URLs that users in the community of users co-visited with one or more of the URLs in the first set during one or more time intervals and, optionally, subject to certain filtering criteria. Determining 116 (FIG. 1) and/or identifying 118 (FIG. 1) the URLs for inclusion in the second set of URLs using such co-visits from the community of users over the time interval is useful in obtaining robust weights in one or more of the search boost vectors in that the co-visitation patterns can be analyzed over a larger sample set. In particular, the aggregate determination over time and for the community of users is useful in reducing the impact of noise, which is often associated with sparse or limited data. Noise may include co-visited URLs that do not reflect a topical relationship, i.e., the content at one or more of the URLs may not be of interest to the user. For example, a jump from one URL to another URL may represent a random jump from URL to URL and, by itself, implies no connection between the corresponding content. In addition, the use of the community of users allows additional URLs, and thus additional content, that were never visited by the user to be included in the second set of URLs. Such additional URLs may be of interest to the user. The community of users may be defined as a group of users sharing common set of characteristics (e.g., the group of users who share a common computer or live within the same household, a group of co-workers, users of a particular search engine and/or users of the Internet).

In some embodiments, co-visits to one or more of the additional URLs that are indicative of a topical relationship with content at one or more of the URLs in the first set of URLs, and that may be potentially of interest for inclusion in the second set of URLs, are determined using one or more uniqueness factors and/or one or more consistency factors 114 (FIG. 1). The various factors may have the effect of filtering out those co-visits that are less likely to reveal a topical connection and/or that are so few in number as to be spurious or reveal individual user activities. A uniqueness factor may include a conditional probability that an additional URL B is co-visited if a URL A in the first set of URLs is visited. Note that the reverse may not always be true. For example, a user visiting a URL associated with basketball might often visit a URL associated with a certain type of shoe manufacturer. Accordingly, a person interested in basketball might also be interested in the URL of the shoe manufacturer. However, a person visiting the shoe manufacturer may or may not be interested in basketball. Therefore, in some embodiments, various types of conditional probabilities are considered. The co-visits may be by the community of users during the time interval. The time interval is used to assist in making the determination of the likelihood of a related co-visit (e.g., a visit to URL B days after URL A is visited is certainly less likely to be related than a visit to URL C within minutes of a visit to URL A). There are, of course, many time intervals that can be used. For example, another time interval is the period over which the query log is examined to determine co-visits (e.g., over the last day, week, month or year). In some embodiments, the uniqueness factor must be equal to or greater than a threshold (e.g., 0.90) in order for the potential relationship between content at two or more URLs to be considered.

A consistency factor may include an absolute number of visits that are made to URL A, URL B and/or co-visits to URL A and URL B. In some embodiments, the consistency factor must be greater than a threshold in order for the URL to be considered to provide enough visitations for use in determining a relationship between content at the URLs (e.g., 10,000 within a day). In some embodiments, a co-visitation is not considered to provide information suggesting a relationship between content at the two URLs unless both the uniqueness factor threshold and the consistency factor threshold are met or exceeded.

FIG. 8 illustrates an embodiment of a URL visit and co-visit data structure 880 that may be used when determining one or more uniqueness and/or one or more consistency factors. The data structure 880 has multiple entries 890. Each entry 890, such as first entry 890_1, has first and second URLs 892 and 893, which are a URLs from the historical log (e.g., URL B_1 and URL A_1), co-visit frequency 894 (during the time interval over which the log is being examined) of the two URLs (e.g., the number of times URLs 892 and 893 were visited within a predefined time window) and visit frequency 894 for the second URL 893 during the time interval over which the log is being examined. For example, the first URL 892 in each entry 890 may be a URL from the first set discussed above, while the second URL 893 in the same entry may be a candidate for inclusion in the second set because it was co-visited with the first URL at least once. In some embodiments, the co-visit frequency 894 is related to the conditional probability that the URLs 892 and 893 are co-visited given that the URL 892 is visited, plus the conditional probability that URL 893 is co-visited given that the URL 892 is visited. In some embodiments, the co-visit frequency 894 is related to the probability that the URL 892 and 893 are visited plus the conditional probability that URL 892 is co-visited given that the URL 893 is visited and the conditional probability that the URL 892 is co-visited given that URL 893 is visited. In some embodiments, the co-visit frequency 894 is related to the probability that the URLs 892 and 893 are visited without taking into consideration conditional probabilities.

In an exemplary embodiment, the "1" entry in the column 894 for first entry 890_1 illustrates that URL A and URL B_1 were co-visited once. In this exemplary embodiment, a uniqueness factor is determined by dividing the number of co-visits of URL A_1 and URL B_1 894 divided by the number of total visits to URL A_1 896 (e.g., 1). In this exemplary embodiment, a consistency factor is represented by the number of visits to the URL A_1 896 during the time period (e.g., 1). As can be seen from the examining the uniqueness factor and consistency factor, URL B_1 was co-visited with URL A_1 only once and URL A_1 was itself not visited many times. Therefore, the one co-visitation of URL B_1 to URL A_1 is not likely to provide enough information to indicate a relationship between content at URL A_1 and URL B_1. In a second entry 890_k, URL B_2 was co-visited with URL C 5,000 times and URL C was visited 1,000,000 times. The corresponding uniqueness factor is low (i.e., $5,000/1,000,000 = 0.005$) but the consistency factor is high (i.e., URL C is visited 1,000,000 times). This shows that URL B_2 and URL C were co-visited a relatively few number of times, as compared to the number of times URL C was visited. Finally, the nth entry 890_n illustrates a co-visitation frequency of 9,000 and a visitation frequency of 10,000. The uniqueness factor for the entry 890_n is relatively high (i.e., $0.90 = 9,000/10,000$) and the consistency factor is 10,000. In this exemplary embodiment, with a uniqueness factor of 0.90 and a consistency factor of 10,000, URL D would likely be included in the second set of URLs. In some embodiments, the corresponding weight in one or more search boost vectors would be one plus the uniqueness factor. Uniqueness factors may be determined for one or more URLs in the first set of URLs and/or the second set of URLs. In some embodiments, one or more uniqueness factors are normalized by one or more inverse document frequencies, such as the inverse of the visit frequency to URL 896.

In some embodiments, only uniqueness factors are determined. If a particular uniqueness factor exceeds a threshold, such as 50% (i.e., 0.50) using the above techniques, then consistency between two or more URLs is likely and the corresponding additional URL is included in the second set of URLs. In other embodiments, one or more uniqueness factors are only determined if an absolute number of visits to one or more URLs exceeds a threshold (e.g., 10,000).

In some embodiments, and as mentioned above, one or more uniqueness factors may include an inverse conditional probability, e.g., the number of co-visits to URL A divided by the total number of visits to URL B. Directionality in the determination of one or more uniqueness factors may be useful in some circumstances. For example, the first content at one of the URLs in the first set of URLs may be basketball. The additional content at one of the additional URLs may be sports shoes, such as sneakers. Determining the uniqueness factor by dividing total number of co-visits to the additional content by visits to the first content is more interesting than determining the uniqueness factor by dividing co-visits to the first content by visits to the additional content since basketball may be relevant to sports shoes but sport shoes need not be relevant to basketball.

Figure 4:
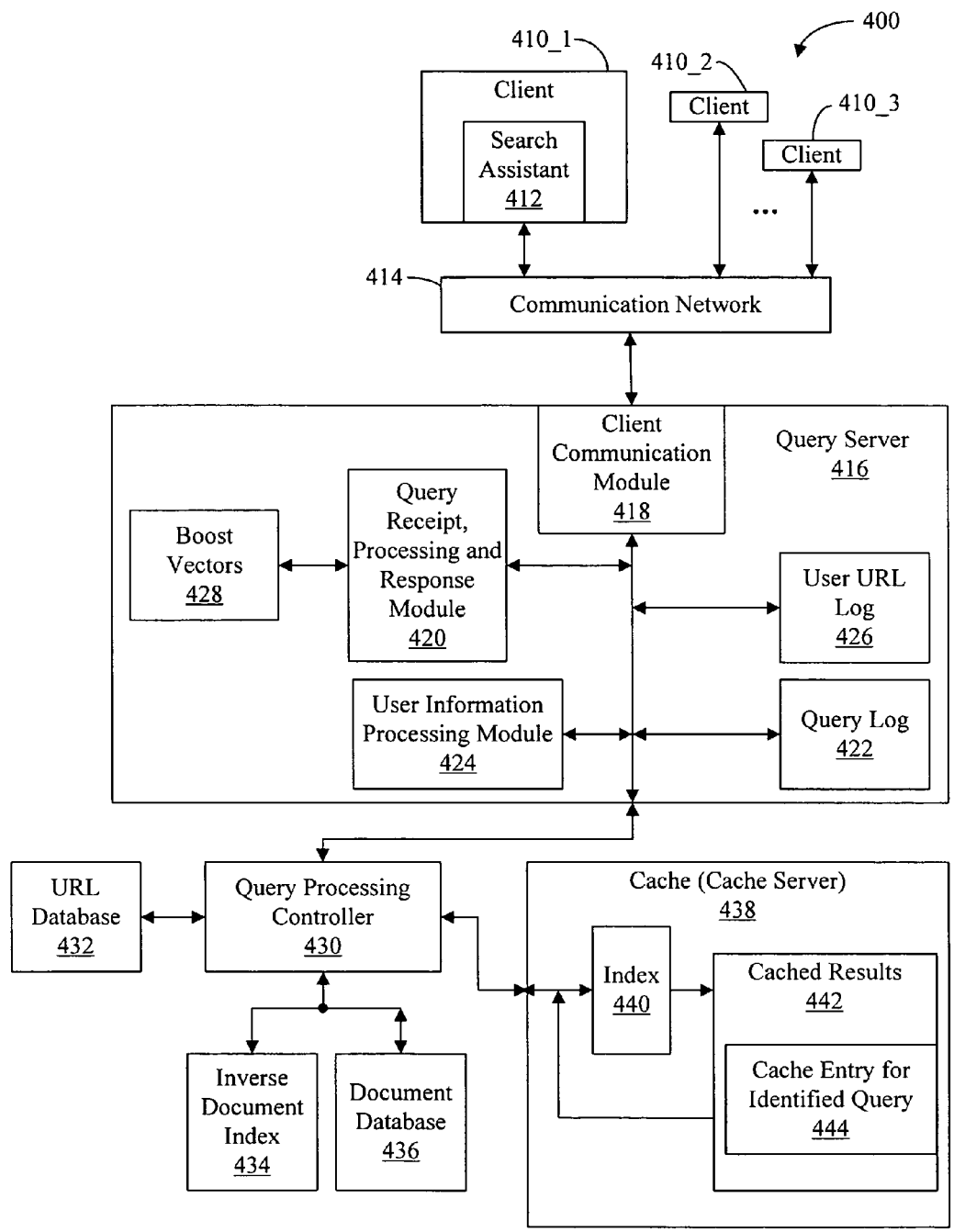
FIG. 4 is a block diagram of clients and a search engine according to some embodiments of the invention.

Attention is now given to hardware and systems that may be used to implement embodiments of methods for generating one or more search boost vectors, such as method 100 (FIG. 1), and for boosting one or more search results, such as method 200 (FIG. 2). FIG. 4 is a block diagram illustrating an embodiment of a search engine system 400 that generates search results in response to search queries from one or more clients 410. Each client 410 may have a search assistant, such as search assistant 412. It should be appreciated that the layout of the search engine system 400 is merely exemplary and may take on any other suitable layouts or configurations. The search engine system 400 is used to search an index of documents, such as billions of web-pages or other documents indexed by modern search engines.

Note that the search engine system 400 can be used as an Internet search engine, for locating documents on the WWW, or as an Intranet search engine, for locating documents stored on servers or other hosts within an Intranet. In addition, the methodology described herein is applicable to implementations where only portions of documents, such as titles and abstracts, are stored in the database of the search engine system 400.

The search engine system 400 may include multiple data centers each housing a backend. The data centers are generally widely dispersed from one another, such as across the continental United States. Search queries submitted by users at one of the clients 410 to the search engine system 400 are routed to an appropriate backend as part of the Domain Name System (DNS), based on current load, geographic locality and/or whether that datacenter is operating.

Each backend preferably includes multiple query servers, such as query server 416, coupled to a communications network 414. The communications network 414 may be the Internet, but may also be any local area network (LAN) and/or wide area network (WAN). In some embodiments, each query server 416 is a server that receives search query requests and delivers search results in the form of web pages via HTTP, XML or similar protocols. Alternatively, if the query server 416 is used within a LAN, i.e., internally and not by the public, it may be an Intranet server. In essence, the query servers, such as query server 416, are configured to control the search process, including searching a document index, analyzing and formatting the search results, and also including boosting one or more of the search results.

Each backend also preferably includes multiple query processing controllers, such as query processing controller 430, coupled to the multiple query servers, such as the query server 416. Each of the query processing controllers may be coupled to a cache 438, a URL database 432, an inverse document index 434 and a document database 436. Each query processing controller is configured to receive requests from one of the query servers, such as the query server 416, and transmit the requests to the cache 438, the URL database 432, the inverse document index 434 and the document database 436.

The cache 438 is used to increase search efficiency by temporarily storing previously located search results. The efficiency and cost of performing a search is dependent on a number of factors, such as the various combinations of terms and/or keywords used in the search query, the length of time spent on the search and the number of documents indexed. The average response time and cost of a search is lowered by storing the search results 442 of previously requested search queries in the temporary storage or cache 438 of the search engine system 400. One of the benefits of keeping a cache of commonly searched information is that it ensures a fast response to subsequent search queries for the same information, as it takes less time to retrieve the information from local memory. Another benefit of caching commonly searched information is to reduce the cost of servicing multiple search queries requesting the same information. When the result of a search is cached, there is no need to perform another search of the document database 436, which may be distributed over multiple disks and/or memory arrays on multiple remote computer servers. Retrieving such information from the multiple disks and/or memory arrays in multiple remote computer servers requires significantly more time and resources than retrieving the information from the cache 438. Instead, an index 440 contains a pointer to a cache entry corresponding to a current search query 444.

The search rank values for the documents in the search results are conveyed to the query processing controller 430 and/or the query server 416, and are used to construct an ordered search result list. Once the query processing controller 430 constructs the ordered search result list, the query processing controller 430 transmits to the document database 436 a request for snippets of an appropriate subset of the documents in the ordered search list. For example, the query processing controller 430 may request snippets for the first fifteen or so of the documents in the ordered search result list. The document database 436 constructs snippets based on the search query, and returns the snippets to the query processing controller 430. The query processing controller 430 then returns a list of located documents and snippets back to the query server 416. In some embodiments, the snippets are stored in the cache server 438 along with the cached results 442. As a result, in these embodiments the query processing controller 430 only requests snippets for documents, if any, for which it is unable to obtain valid cached snippets from the cache server 438.

The query server 416 has a client communication module 418 for communicating, using the communication network 414, with one or more of the clients 410. The query server 416 also may have a user URL log or user URL log 426, a query log 422, user information processing module 424, query receipt, processing and response module 420 and one or more search boost vectors 428. User information processing module 424 may store user preferences or profiles and/or content site profiles. User URL log 426 may store one or more URLs as well as corresponding time stamps for when the one or more URLs are visited. Storage of this information may be in the query server 416, and/or in one or more additional query servers, including one or more query servers at different locations.

In some embodiments, the query receipt, processing and response module 420 may determine one or more search boost vectors 428 using a method such as method 100 (FIG. 1). The query receipt, processing and response module 420 may select one or more search boost vectors 428 based on one or more user preferences or profiles and/or one or more content site profiles. The query receipt, processing and response module 420 may boost one or more of the search results, i.e., the ranking in the list of located documents and snippets. The query server 416 then transmits the search results or a portion of the search results to the user requesting the search. In some embodiments, the boosting of search results is performed before snippet generation or retrieval from cache, because snippets are initially generated only for the top N (e.g., 10 to 25) search results, until a user requests a listing of lower ranked search results. By boosting the search results first and then generating or retrieving snippets, snippets are generated or retrieved only (or primarily) for search results conveyed to and/or presented to the requestor, thereby conserving the system resources used to generate snippets.

FIG. 5 is an embodiment of a data structure 500 corresponding to the user URL log 426 (FIG. 4). The data structure 500 has multiple entries 510. Each of the entries 510, such as entry 510_1, has a user or source identification 512, a time stamp 514 and a URL 516. The URL 516 represents a URL visit or download by the identified user. The data structure may be used in conjunction with the method 100 illustrated in FIG. 1 to determine one or more search boost vectors 428 (FIG. 4). The source identification 512 may be provided by a unique cookie associated with a particular search session, toolbar instance or user and may provide additional information.

Figure 6:
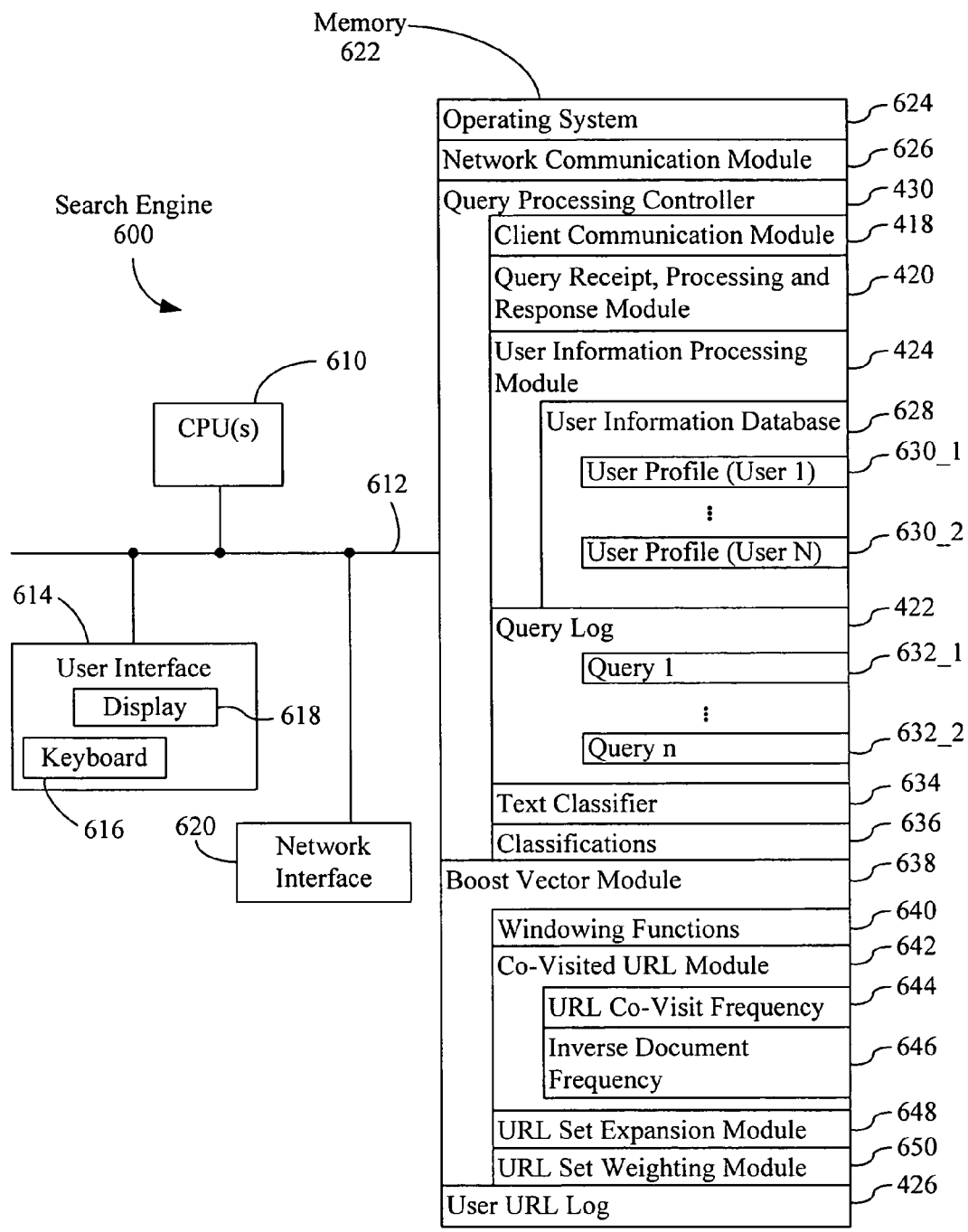
FIG. 6 is a block diagram of a search engine according to some embodiments of the invention.

FIG. 6 is a block diagram illustrating an embodiment of a search engine 600 that implements the methods described above. The search engine 600 may include at least one data processor or central processing unit (CPU) 610, one or more optional user interfaces 614, a communications or network interface 620 for communicating with other computers, servers and/or clients, a memory 622 and one or more signal lines 612 for coupling these components to one another. The user interface 614 may have a keyboard/mouse 616 and/or a display 618. The one or more signal lines 612 may constitute one or more communications buses.

The memory 622 may include high-speed random access memory and/or non-volatile memory, such as one or more magnetic disk storage devices. The memory 622 may store an operating system 624, such as LINUX, UNIX or WINDOWS, that includes procedures for handling basic system services and for performing hardware dependent tasks. The memory 622 may also store communication procedures in a network communication module 626. The communication procedures are used for communicating with clients, such as the clients 410 (FIG. 4), and with other servers and computers in the search engine 600.

The memory 622 may also store the query processing controller 430. The query processing controller 430 includes the following elements, or a subset or superset of such elements: the client communication module 418, the query receipt, processing and response module 420, the user information processing module 424, the query log 422, a text classifier 634 and classifications 636. The user information processing module 424 may include a user information database 628 having one or more user profiles 630. The user information database 628 may also have one or more content site profiles. The query log 422 may include one or more queries 632.

The memory 622 may also include a boost vector module 638 and the user URL log 426. The boost vector module 638 may include windowing functions 640, such as windowing function 900 in FIG. 9A, co-visited URL module 642, URL set expansion module 648 and URL set weighting module 650. The co-visited URL module 642 may include URL co-visit frequency 644 and inverse document frequency 646 values, such as those illustrated in data structure 880 (FIG. 8). The URL set expansion module 648 and the URL set weighting module 650 may be used in the method 100 illustrated in FIG. 1 to generate one or more search boost vectors.

Although FIG. 6 (like FIG. 4) shows search engine 600 as a number of discrete items, FIG. 6 is intended more as a functional description of the various features which may be present in a search engine system rather than as a structural schematic of the embodiments described herein. In practice, and as recognized by those of ordinary skill in the art, the functions of the search engine 600 may be distributed over a large number of servers or computers, with various groups of the servers performing particular subsets of those functions. Items shown separately in FIG. 6 could be combined and some items could be separated. For example, some items shown separately in FIG. 6 could be implemented on single servers and single items could be implemented by one or more servers (e.g., the query log 422 in FIG. 4 could be distributed among a plurality of servers). The actual number of servers in a search engine system and how features are allocated among them will vary from one implementation to another, and may depend in part on the amount of information stored by the system and/or the amount data traffic that the system must handle during peak usage periods as well as during average usage periods.

Figure 7:
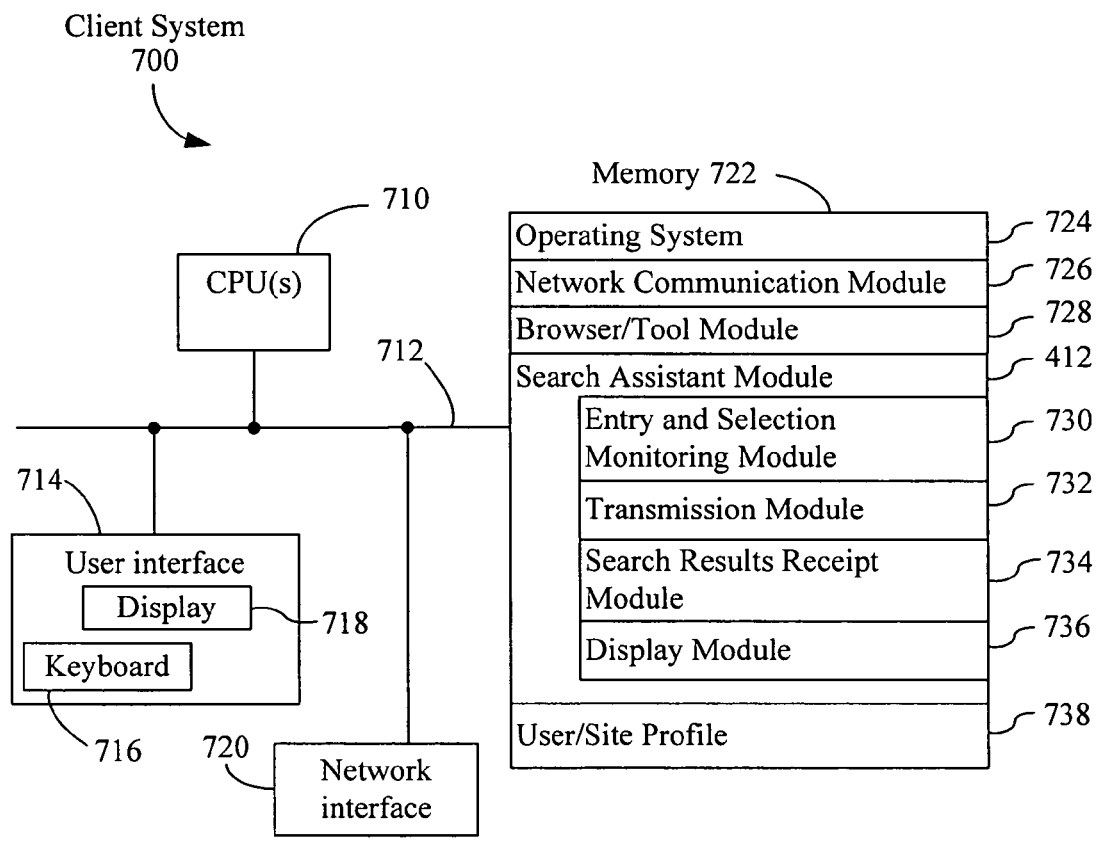
FIG. 7 is a block diagram of a client system according to some embodiments of the invention.

FIG. 7 illustrates a block diagram of an embodiment of a client system 700, such as those used by the clients 410 (FIG. 4). The client system 700 may include at least one data processor or central processing unit (CPU) 710, one or more optional user interfaces 714, a communications or network interface 720 for communicating with other computers, servers and/or clients, a memory 722 and one or more signal lines 712 for coupling these components to one another. The user interface 714 may have a keyboard/mouse 716 and/or a display 718. The one or more signal lines 712 may constitute one or more communications buses.

The memory 722 may include high-speed random access memory and/or non-volatile memory, such as one or more magnetic disk storage devices. The memory 722 may store an operating system 724, such as LINUX, UNIX or WINDOWS, that includes procedures for handling basic system services and for performing hardware dependent tasks. The memory 722 may also store communication procedures in a network communication module 726. The communication procedures are used for communicating with the search engine 600 (FIG. 6).

The memory may also include the following elements, or a subset or superset of such elements: a browser or browser tool module 728, the search assistant module 412 and one or more user or content site profiles 738. The profiles 738 may be generated, much like a cookie, by the search assistant module 412 by monitoring user activities or it may be generated remotely based on content of one or more URLs visited or associated with a user or content site. The search assistant module 412 may include the following elements, or a subset or superset of such elements: a monitoring module (or instructions) 730 for monitoring user input 214 (FIG. 2), a transmission module (or instructions) 732 for sending a search query 216 (FIG. 2), a search results receipt module (or instructions) 734 for receiving search results 224 (FIG. 2) and a display module (or instructions) 736 for displaying search results. In embodiments where the client system 700 is coupled to a local server computer, one or more of the modules and/or applications in the memory 722 may be stored in a server computer at a different location than the user.

Each of the above identified modules and applications corresponds to a set of instructions for performing one or more functions described above. These modules (i.e., sets of instructions) need not be implemented as separate software programs, procedures or modules, and thus various subsets of these modules may be combined or otherwise re-arranged in various embodiments. In some embodiments, memory 722 (FIG. 7) or 622 (FIG. 6) may store a subset of the modules and data structures identified above. Furthermore, memory 722 or 622 may store additional modules and data structures not described above.

In some embodiments, the method 100 in FIG. 1 for determining one or more search vectors may be iterated. In these embodiments, one or more URLs in the first set of URLs and/or the second set of URLs may be used as a new first set of URLs for a subsequent iteration of the method 100.

In some embodiments, boosting of one or more search results may be accomplished without using a search boost vector. For example, additional terms or keywords may be added to a search query based on one or more user profiles and/or one or more content site profiles. Alternatively, the search may be modified in one or more query processing controllers, such as query processing controller 430 (FIG. 4). These additional embodiments, however, may require storing additional search results in the cache, or changing how results are stored in the cache 438 (FIG. 4). Such a modification could be cumbersome and may entail a very large memory overhead to store a large number of personalized search results for multiple users.

The foregoing descriptions of specific embodiments of the present embodiments are presented for purposes of illustration and description. They are not intended to be exhaustive or to limit the invention to the precise forms disclosed. Rather, it should be appreciated that many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method, comprising:
at a search engine system comprising one or more processors and memory storing one or more programs executed by the one or more processors:
providing a first set of content location identifiers for first content;
using the first set of content location identifiers to identify a second set of content location identifiers for second content, wherein the second content is related to the first content based on co-visits by individual users, in a community of users, within a time interval, to a respective first content location identifier in the first set of content location identifiers and a respective second content location identifier in the second set of content location identifiers;
generating a search boost vector having weights corresponding to content location identifiers in the second set of content location identifiers, wherein the weights are based at least in part on a frequency of user visits to corresponding content location identifiers in the second set of content location identifiers; and
providing the search boost vector to a query server, wherein the search boost vector is for use by the query server to boost content location identifiers in the second set when serving search results.

2. The method of claim 1, wherein one or more weights are based on a frequency of co-visitations by individual users in the community of users.

3. The method of claim 1, wherein, on average, content location identifiers in the second set visited by numbers of users in the community of users in a first range have lower weights in the search boost vector than content location identifiers in the second set visited by numbers of users in the community of users in a second range, wherein the first range corresponds to substantially larger numbers of users than the second range.

4. The method of claim 1, wherein the first content is associated with a first user; and comprising:
repeating the first providing, using, generating, and second providing for each user in a plurality of users, wherein, for each repeat, the first content is associated with a respective user in the plurality of users, and a respective search boost vector is provided to the query server for each user in the plurality of users.

5. The method of claim 1, wherein one or more of the weights in the search boost vector are inversely proportional to a number of content location identifiers visited by the users in the community of users between a visit by an individual user to the respective first content location identifier and a co-visit by the individual user to the respective second content location identifier.

6. The method of claim 1, wherein generating the search boost vector includes determining weights corresponding to content location identifiers in the first set of content location identifiers.

7. The method of claim 1, wherein generating the search boost vector includes applying a temporal window function to one or more of the weights corresponding to one or more of the content location identifiers in a set selected from the group consisting of the first set of content location identifiers, the second set of content location identifiers, and the first and second sets of content location identifiers, the temporal window function having weighting factors that are a function of the time interval.

8. The method of claim 1, wherein the search boost vector is ranked and truncated so as to include only entries with rank values exceeding a rank threshold.

9. The method of claim 1, wherein generating the search boost vector includes determining a consistency factor for one or more of the content location identifiers in the second set of content location identifiers.

10. The method of claim 9, wherein the consistency factor includes an absolute number of co-visits by individual users to the one or more of the content location identifiers in the second set of content location identifiers and the one or more of the content location identifiers in the first set of content location identifiers.

11. The method of claim 1, wherein generating the search boost vector includes determining a respective uniqueness factor for each of a plurality of respective content location identifiers in the second set of content location identifiers, wherein determining the respective uniqueness factor for a respective content location identifier in the second set of content location identifiers comprises dividing a co-visitation frequency of a respective first content location identifier with the respective second content identifier by a visit frequency of the respective second content identifier.

12. The method of claim 11, wherein using the first set of content location identifiers to identify the second set of content location identifiers includes determining if the uniqueness factor of a respective content location identifier exceeds a predefined uniqueness factor threshold.

13. A computer readable storage medium storing one or more programs executed by a computer system, the one or more programs comprising:
  instructions for providing a first set of content location identifiers for first content;
  instructions for using the first set of content location identifiers to identify a second set of content location identifiers for second content, wherein the second content is related to the first content based on co-visits by individual users, in a community of users, within a time interval, to a respective first content location identifier in the first set of content location identifiers and a respective second content location identifier in the second set of content location identifiers;
  instructions for generating a search boost vector having weights corresponding to content location identifiers in the second set of content location identifiers, wherein the weights are based at least in part on a frequency of user visits to corresponding content location identifiers in the second set of content location identifiers; and
  instructions for providing the search boost vector to a query server, wherein the search boost vector is for use by the query server to boost content location identifiers in the second set when serving search results.

14. The computer readable storage medium of claim 13, wherein one or more weights are based on a frequency of co-visitations by individual users in the community of users.

15. The computer readable storage medium of claim 13, wherein, on average, content location identifiers in the second set visited by numbers of users in the community of users in a first range have lower weights in the search boost vector than content location identifiers in the second set visited by numbers of users in the community of users in a second range, wherein the first range corresponds to substantially larger numbers of users than the second range.

16. The computer readable storage medium of claim 13, wherein the first content is associated with a first user; and comprising:
  instructions for repeating the first providing, using, generating, and second providing for each user in a plurality of users, wherein, for each repeat, the first content is associated with a respective user in the plurality of users, and a respective search boost vector is provided to the query server for each user in the plurality of users.

17. The computer readable storage medium of claim 13, wherein one or more weights are inversely proportional to a number of content location identifiers visited by the users in the community of users between a visit by an individual user to the respective first content location identifier and a co-visit by the individual user to the respective second content location identifier.

18. The computer readable storage medium of claim 13, wherein the instructions for generating the search boost vector include instructions for determining weights corresponding to content location identifiers in the first set of content location identifiers.

19. The computer readable storage medium of claim 13, wherein the instructions for generating the search boost vector include instructions for applying a temporal window function to one or more of the weights corresponding to one or more of the content location identifiers in a set selected from the group consisting of the first set of content location identifiers, the second set of content location identifiers and the first and second sets of content location identifiers, the temporal window function having weighting factors that are a function of the time interval.

20. The computer readable storage medium of claim 13, wherein the search boost vector is ranked and truncated so as to include only entries with rank values exceeding a rank threshold.

21. The computer readable storage medium of claim 13, wherein the instructions for generating the search boost vector include instructions for determining a consistency factor for one or more of the content location identifiers in the second set of content location identifiers.

22. The computer readable storage medium of claim 21, wherein the consistency factor includes an absolute number of co-visits by individual users to the one or more of the content location identifiers in the second set of content location identifiers and the one or more of the content location identifiers in the first set of content location identifiers.

23. The computer readable storage medium of claim 13, wherein the instructions for generating the search boost vector include instructions for determining a respective uniqueness factor for each of a plurality of respective content location identifiers in the second set of content location identifiers, wherein determining the respective uniqueness factor for a respective content location identifier in the second set of content location identifiers comprises dividing a co-visitation frequency of a respective first content location identifier with the respective second content identifier by a visit frequency of the respective second content identifier.

24. The computer readable storage medium of claim 23, wherein the instructions for using the first set of content location identifiers to identify the second set of content location identifiers include determining if the uniqueness factor for a respective content location identifier exceeds a predefined uniqueness factor threshold.

25. A computer, comprising:
  a main memory;
  a processor; and
  a program, stored in the main memory and executed by the processor, the program including:
    instructions for providing a first set of content location identifiers for first content;
    instructions for using the first set of content location identifiers to identify a second set of content location identifiers for second content, wherein the second content is related to the first content based on co-visits by individual users, in a community of users, within a time interval, to a respective first content location identifier in the first set of content location identifiers and a respective second content location identifier in the second set of content location identifiers;
    instructions for generating a search boost vector having weights corresponding to content location identifiers in the second set of content location identifiers, wherein the weights are based at least in part on frequency of user visits to corresponding content locations; and instructions for providing the search boost vector to a query server, wherein the search boost vector is for use by the query server to boost content location identifiers in the second set when serving search results.

26. The computer of claim 25, wherein one or more weights are based on a frequency of co-visitations by individual users in the community of users.

27. The computer of claim 25, wherein, on average, content location identifiers in the second set visited by numbers of users in the community of users in a first range have lower weights in the search boost vector than content location identifiers in the second set visited by numbers of users in the community of users in a second range, wherein the first range corresponds to substantially larger numbers of users than the second range.

28. The computer of claim 25, wherein the first content is associated with a first user; and comprising:
instructions for repeating the first providing, using, generating, and second providing for each user in a plurality of users, wherein, for each repeat, the first content is associated with a respective user in the plurality of users, and a respective search boost vector is provided to the query server for each user in the plurality of users.

29. The computer of claim 25, wherein one or more weights are inversely proportional to a number of content location identifiers visited by the users in the community of users between a visit by an individual user to the respective first content location identifier and a co-visit by the individual user to the respective second content location identifier.

30. The computer of claim 25, wherein the instructions for generating the search boost vector include instructions for determining weights corresponding to content location identifiers in the first set of content location identifiers.

31. The computer of claim 25, wherein the instructions for generating the search boost vector include instructions for applying a temporal window function to one or more of the weights corresponding to one or more of the content location identifiers in a set selected from the group consisting of the first set of content location identifiers, the second set of content location identifiers, and the first and second sets of content location identifiers, the temporal window function having weighting factors that are a function of the time interval.

32. The computer of claim 25, wherein the search boost vector is ranked and truncated so as to include only entries with rank values exceeding a rank threshold.

33. The computer of claim 25, wherein the instructions for generating the search boost vector include instructions for determining a consistency factor for one or more of the content location identifiers in the second set of content location identifiers.

34. The computer of claim 33, wherein the consistency factor includes an absolute number of co-visits by individual users to the one or more of the content location identifiers in the second set of content location identifiers and the one or more of the content location identifiers in the first set of content location identifiers.

35. The computer of claim 25, wherein the instructions for generating the search boost vector include instructions for determining a respective uniqueness factor for each of a plurality of respective content location identifiers in the second set of content location identifiers, wherein determining the respective uniqueness factor for a respective content location identifier in the second set of content location identifiers comprises dividing a co-visitation frequency of a respective first content location identifier with the respective second content identifier by a visit frequency of the respective second content identifier.

36. The computer of claim 35, wherein the instructions for using the first set of content location identifiers to identify the second set of content location identifiers include instructions for determining if the uniqueness factor for a respective content location identifier exceeds a predefined uniqueness factor threshold.

37. A computer-implemented method, comprising:
at a search engine system comprising one or more processors and memory storing one or more programs executed by the one or more processors:
receiving a search query from a user, wherein the user is a member of a community of users;
identifying search results including at least a portion of a second set of content location identifiers for second content, wherein the second set of content location identifiers is identified using a first set of content location identifiers for first content;
boosting at least a subset of the search results using a search boost vector to produce boosted search results,
the search boost vector having a plurality of weights, wherein a respective weight of the search boost vector is used to boost a respective content location identifier that is in the subset of the search results and that is also in the second set of content location identifiers,
wherein the respective weight is based, at least in part, on (A) co-visits by the user within a time interval to (i) the respective content location identifier in the second set of content location identifiers and (ii) a respective content location identifier in the first set of content location identifiers, and (B) a frequency of user visits to the respective content location identifier in the second set of content location identifiers; and
providing the boosted search results to the user.

38. The method of claim 37, further comprising:
selecting the search boost vector from a plurality of search boost vectors based on at least one of: user preference information, user profile information, and content site profiles.

39. A computer readable storage medium storing one or more programs executed by a computer system, the one or more programs comprising:
instructions for receiving a search query from a user, wherein the user is a member of a community of users;
instructions for identifying search results including at least a portion of a second set of content location identifiers for second content, wherein the second set of content location identifiers is identified using a first set of content location identifiers for first content;
instructions for boosting at least a subset of the search results using a search boost vector to produce boosted search results,
the search boost vector having a plurality of weights, wherein a respective weight of the search boost vector is used to boost a respective content location identifier that is in the subset of the search results and that is also in the second set of content location identifiers,
wherein the respective weight is based, at least in part, on (A) co-visits by the user within a time interval to (i) the respective content location identifier in the second set of content location identifiers and (ii) a respective content location identifier in the first set of content location identifiers, and (B) a frequency of user visits to the respective content location identifier in the second set of content location identifiers; and instructions for providing the boosted search results to the user.

40. The computer readable storage medium of claim 39, further comprising:
  instructions for selecting the search boost vector from a plurality of search boost vectors based on at least one of: user preference information, user profile information, and content site profiles.

41. A computer, comprising:
  a main memory;
  a processor; and
  a program, stored in the main memory and executed by the processor, the program including:
  instructions for receiving a search query from a user, wherein the user is a member of a community of users;
  instructions for identifying search results including at least a portion of a second set of content location identifiers for second content, wherein the second set of content location identifiers is identified using a first set of content location identifiers for first content;
  instructions for boosting at least a subset of the search results using a search boost vector to produce boosted search results, the search boost vector having a plurality of weights, wherein a respective weight of the search boost vector is used to boost a respective content location identifier that is in the subset of the search results and that is also in the second set of content location identifiers,
  wherein the respective weight is based, at least in part, on (A) co-visits by the user within a time interval to (i) the respective content location identifier in the second set of content location identifiers and (ii) a respective content location identifier in the first set of content location identifiers, and (B) a frequency of user visits to the respective content location identifier in the second set of content location identifiers; and
  instructions for providing the boosted search results to the user.

42. The computer of claim 41, further comprising:
  instructions for selecting the search boost vector from a plurality of search boost vectors based on at least one of: user preference information, user profile information, and content site profiles.

* * * * *